UNITED STATES PATENT OFFICE.

FRANK S. WALTON, OF PHILADELPHIA, PENNSYLVANIA.

METHOD OR PROCESS OF TREATING AUTOMOBILE-TIRES AND THE INNER TUBES THEREOF.

1,237,977.          Specification of Letters Patent.      Patented Aug. 21, 1917.

No Drawing.      Application filed April 12, 1917. Serial No. 161,435.

*To all whom it may concern:*

Be it known that I, FRANK S. WALTON, a citizen of the United States, residing in Philadelphia, Pennsylvania, have invented an Improved Method or Process of Treating Automobile-Tires and the Inner Tubes Thereof, of which the following is a specification.

My invention relates to the preservation of fibrous or fabric structures with which rubber or a rubber-containing material may or may not be combined; and the object of my invention is to provide a special method of treating automobile tire shoes of the usual type receiving an inner inflatable tube, (the walls of which tires are made up of a plurality of layers of fibers or fabric and rubber, and a cementitious body,) for the purpose of lubricating and rendering pliable the fibers employed as well as for the purpose of repelling aqueous moisture and reducing heat; thereby increasing the wearing properties of the tires and greatly reducing the danger of blow-outs due to the usual wear and tear to which they are subjected. A further object of my invention is to effect the preservation of the inner tubes of rubber employed with such tire shoes; the material employed for the purpose of preserving the tire shoes having a beneficial and preservative effect upon such inner rubber tubes.

I am not advised as to just what happens to the fabric in the carcass or body of the tire shoe and the actual reason for it giving way, although it can readily be understood that under the constant motion of the tire when in use, the strands of the fibers or fabric employed are being subjected to strains in all directions, with the result that sooner or later they give way and the tire breaks down. Such condition is recognized by all tire manufacturers, and constant efforts are directed toward the production of a tire that will avoid this defect. The usual methods, so far as I am advised, have been to increase the weight of the fabric employed or to so manipulate the strands or fibers making up the same as to increase their strength and reduce their liability to break under the usual wear and tear accompanying the conditions of use. In all probability, the breaking down of the fabric of a tire is due to friction of the strands or threads of the fibers or fabric employed, which are in constant motion when the tire is in use, due to the constant changing of the position of the same; such friction causing heat and rendering the strands and fibers of the fabric dry and brittle.

It is generally conceded that the fibers or strands of the fabric constituting the wall of the body or carcass of the tire shoe dry out, become broken, coarse in texture, and cause friction between the wall of the shoe and the inner tube. Such friction not only weakens the inner tube, but also the tire shoe and it eventually breaks; such rupture not being able to withstand the pressure of air within the inner tube, a "blow-out" occurs, which destroys both inner tube and shoe.

These conditions have led me to the belief that if the individual strands or fibers of the fabric as well as the surface of the same were properly lubricated and made pliable, the tire shoe would be benefited and the life of such shoe would be materially increased. As the treatment I propose will require the application of the lubricating medium to the inner surface of the tire shoe, it will come in contact with the inner tube and the latter will also be benefited; the lubricant providing a protective layer or coating for the same which reduces the friction between the tube and the tire shoe.

In my Patent No. 1,223,302, dated April 17, 1917, I have described the use of a non-drying oleaginous body of animal origin which may be employed for the purpose, and it is essential in the carrying out of the process constituting my invention that a substantially non-drying or a semi-drying oleaginous material, or a suitable combination of both, be employed.

I have discovered that beneficial results may flow from the use of any one of a number of non-drying or semi-drying oleaginous bodies of vegetable origin in use in the arts to-day, and my present invention comprises the treatment of tire shoes with a semi-drying oleaginous vegetable body, such as castor oil, blown rape seed oil, or an equivalent semi-drying oleaginous vegetable body capable of performing the desired function, or a combination of two or more of the same, or any combination of any non-drying or semi-drying oleaginous material with a non-drying or semi-drying oleaginous material of vegetable origin. The oleaginous bodies employed may be thick, and if not naturally thick, they may be thickened by some mechanical means, as by blowing the same in the manner well known in the art. I do not wish, however, to be limited to the use of a thickened body of oil or other oleaginous material.

As in my patent before referred to, the treatment I propose includes the application of the oleaginous preserving and lubricating medium to the inner surface of the tire shoe where it will come in contact with the inner tube, and the latter will also be benefited; the lubricant providing a protective layer or coating for the same which reduces the friction between said tube and the inner wall of the tire shoe.

In carrying my invention into effect, I propose to treat new tires as well as tires which have been in use, whether they have run the guaranteed mileage or not, and in practice I propose to treat tire shoes by applying a sufficient quantity of the semi-drying oleaginous vegetable material to the inner wall of the tire shoe to not only penetrate each strand of the fabric or fiber included in or comprising the wall of such tire shoe in order to preserve, lubricate and render the same pliable, but also enough to permit of the formation of a coating on the inner rubber tube, which coating glazes such inner tube and protects it from direct contact with the wall of the shoe; forming a friction-reducing film which acts as a lubricant and protector for both shoe and inner tube.

While I am not specifically advised as to what actually occurs in the wall of the carcass or body of the shoe due to the oiling treatment, I believe that the application of oil or other oleaginous body has the effect of lubricating the fibers and strands of the fabric, rendering them pliable and providing them with a certain amount of elasticity and destroying their tendency to break short, and at the same time reducing heat and repelling aqueous moisture.

I prefer to employ a thickened oil of vegetable origin, and in all instances I propose to use a substantially non-drying or a semi-drying oleaginous body, or a combination thereof.

In a companion application filed April 14, 1917, Serial No. 162,098, I have referred to the use of an oleaginous product having a mineral base.

I claim:

1. The process of treating automobile tires and inner tubes employed therewith, which comprises the application of an oleaginous vegetable product to the inner wall of the tire shoe with which the inner tube contacts for the impregnation of the shoe therewith and the surface coating of said inner tube.

2. The process of treating automobile tires and inner tubes employed therewith, which comprises the application of a thickened, semi-drying vegetable oil to the inner wall of the tire shoe with which the inner tube contacts for the impregnation of the shoe therewith and the surface coating of said inner tube.

3. The process of treating automobile tires and the inner tubes employed therewith, which comprises the application of castor oil to the inner wall of the tire shoe with which the inner tube contacts for the impregnation of the shoe therewith and the surface coating of said inner tube.

4. The combination with the shoe of an automobile tire and an inner tube employed therewith, of an oleaginous vegetable product interposed between said shoe and the inner tube and impregnating the body of said shoe.

5. The combination with the shoe of an automobile tire and an inner tube employed therewith, of a layer or body of thickened, semi-drying vegetable oil interposed between said shoe and the inner tube and impregnating the body of said shoe.

6. The combination with a shoe of an automobile tire and an inner tube employed therewith, of a body or layer of castor oil interposed between said shoe and the inner tube and impregnating the body of said shoe.

In witness whereof I affix my signature.

FRANK S. WALTON.

Copies of this patent may be obtained for five cents each, by addressing the "Commissioner of Patents, Washington, D. C."